US 6,736,447 B2

(12) United States Patent  (10) Patent No.: US 6,736,447 B2
Angelo et al.  (45) Date of Patent: May 18, 2004

(54) DUCTED AERODYNAMIC FRONT SECTION OF A VEHICLE

(75) Inventors: Gerald Jay Angelo, Bellevue, WA (US); Wayne K. Simons, Kent, WA (US); Alec Wong, Bellevue, WA (US); Daniel Farmer, Coupeville, WA (US)

(73) Assignee: Paccar Inc, Bellevue, WA (US)

( * ) Notice: Subject to any disclaimer, the term of this patent is extended or adjusted under 35 U.S.C. 154(b) by 0 days.

(21) Appl. No.: 10/307,209

(22) Filed: Nov. 27, 2002

(65) Prior Publication Data

US 2003/0178870 A1 Sep. 25, 2003

Related U.S. Application Data

(60) Provisional application No. 60/365,959, filed on Mar. 19, 2002.

(51) Int. Cl.[7] ............................................. B52D 35/00
(52) U.S. Cl. ......................... 296/180.1; 296/193.11; 296/91; 180/903
(58) Field of Search ............................ 296/180.1, 180.2, 296/190.01, 190.04, 190.05, 190.08, 190.09, 193.1, 193.11, 206, 91; 180/903

(56) References Cited

U.S. PATENT DOCUMENTS

| 2,223,378 A | 12/1940 | Martin |
| 2,792,254 A | 5/1957 | Hagglund |
| 3,616,871 A | 11/1971 | West |
| 3,647,256 A | 3/1972 | Cox |
| 3,791,468 A | * 2/1974 | Bryan, Jr. .................. 180/69.2 |
| 3,836,191 A | 9/1974 | Götz |
| 4,379,582 A | 4/1983 | Miwa |
| 4,842,319 A | * 6/1989 | Ziegler et al. ................. 296/91 |
| 5,082,321 A | * 1/1992 | Brewer ......................... 296/91 |
| 5,308,134 A | * 5/1994 | Stanesic ....................... 296/91 |
| 6,230,832 B1 | 5/2001 | von Mayenburg et al. |
| 6,447,049 B1 | * 9/2002 | Tohda et al. ............. 296/180.1 |

FOREIGN PATENT DOCUMENTS

DE  2841141 A1 * 4/1980 .............. 296/180.1

* cited by examiner

Primary Examiner—D. Glenn Dayoan
Assistant Examiner—Patricia Engle
(74) Attorney, Agent, or Firm—Christensen O'Connor Johnson Kindness PLLC (57) ABSTRACT

A truck front section (120) including a grill (128), a hood (121), and a bridge assembly (137) is provided. The grill has a substantially vertical front surface and an upper portion. The hood has an upper panel (121) with a sloping front end disposed adjacent the grill upper portion. The bridge assembly is disposed above the front end of the hood upper panel and has a pair of oppositely disposed upright end members (133) attached to the hood upper panel. The bridge assembly also has a substantially horizontal aerodynamically shaped member (138 and/or 140) attached to the end members. The upper portion of the grill, the front end of the hood upper panel and the bridge assembly cooperatively form a duct generally disposed above the grill. The duct may discharge into a longitudinal channel (112 and/or 114) formed in the upper panel.

29 Claims, 7 Drawing Sheets

DUCTED AERODYNAMIC FRONT SECTION OF A VEHICLE

CROSS-REFERENCE TO RELATED APPLICATION

This application claims the benefit of Provisional Application No. 60/365,959, filed Mar. 19, 2002, priority from the filing date of which is hereby claimed under 35 U.S.C. §120 and the disclosure of which is hereby expressly incorporated by reference.

FIELD OF THE INVENTION

The present invention relates generally to truck bodies and, more particularly, to aerodynamic front sections of trucks.

BACKGROUND OF THE INVENTION

Motor vehicles, and in particular trucks, are a critical component of the system for transporting materials, goods and people from place to place. The amount of energy required to move such vehicles depends on many factors. For instance, a substantial amount of energy is expended to overcome the resistance encountered in moving the vehicle through air. The amount of energy expended depends in large part on the aerodynamic drag force exerted on the vehicle by the air. A vehicle moving through air experiences a drag force, which may be divided into two components: frictional drag and pressure drag. Frictional drag comes from friction generated generally through the boundary layer as the vehicle passes through the air. Pressure drag results from the net pressure forces exerted as the air flows around the vehicle. A substantial component of the pressure drag is associated with the formation of a low pressure zone behind the vehicle, as evidenced by the formation of a wake behind the vehicle.

The distinction between frictional drag and pressure drag is useful because the two types of drag are due to different flow phenomena. Frictional drag is typically most important for attached flows—that is, where the flow boundary layer has not separated from the vehicle surfaces, and is related to the surface area exposed to the flow. Pressure drag dominates for separated flows, and is generally related to the cross-sectional area of the vehicle facing the air flow. When the drag on vehicle is dominated by pressure drag forces, it will expend far more energy traveling through air than the same vehicle dominated by friction drag forces. It is therefore advantageous in the design of a vehicle to reduce pressure drag forces; thereby increasing the aerodynamic properties and efficiency of the vehicle.

A bluff body, such as a conventional truck hood or front section, produces significant pressure drag at typical highway speeds. One reason for the large pressure drag is the presence of a sharp angle located at a leading edge of the truck hood. More specifically, typical truck front sections include a substantially vertical front surface or grill that meets, along an upper edge, a substantially horizontal top surface. The air flow passing over the front section, therefore, must negotiate an abrupt change in direction as the edge where the hood structure transitions from a substantially vertical orientation to a substantially horizontal orientation. This abrupt turn causes the flow to 'separate' from the top surface of the hood, forming a highly turbulent region of air located directly above the top surface of the hood, between the leading edge and the windshield.

In general, when the drag force experienced by a vehicle is dominated by pressure drag, the vehicle is considered to be bluff, and when the pressure drag is relatively small, the vehicle is considered to be streamlined. For a given truck frontal area at typical highway speeds, the pressure drag can contribute significantly to the total drag force, and therefore to the fuel efficiency (or lack thereof) of the vehicle. For example, it is well known that the drag of a cylinder can be ten times larger than a streamlined shape (such as an airfoil) having the same frontal area. It will be apparent to one skilled in the art that it is advantageous to reduce the total drag force exerted upon a vehicle by reducing pressure drag forces.

Figure 1:
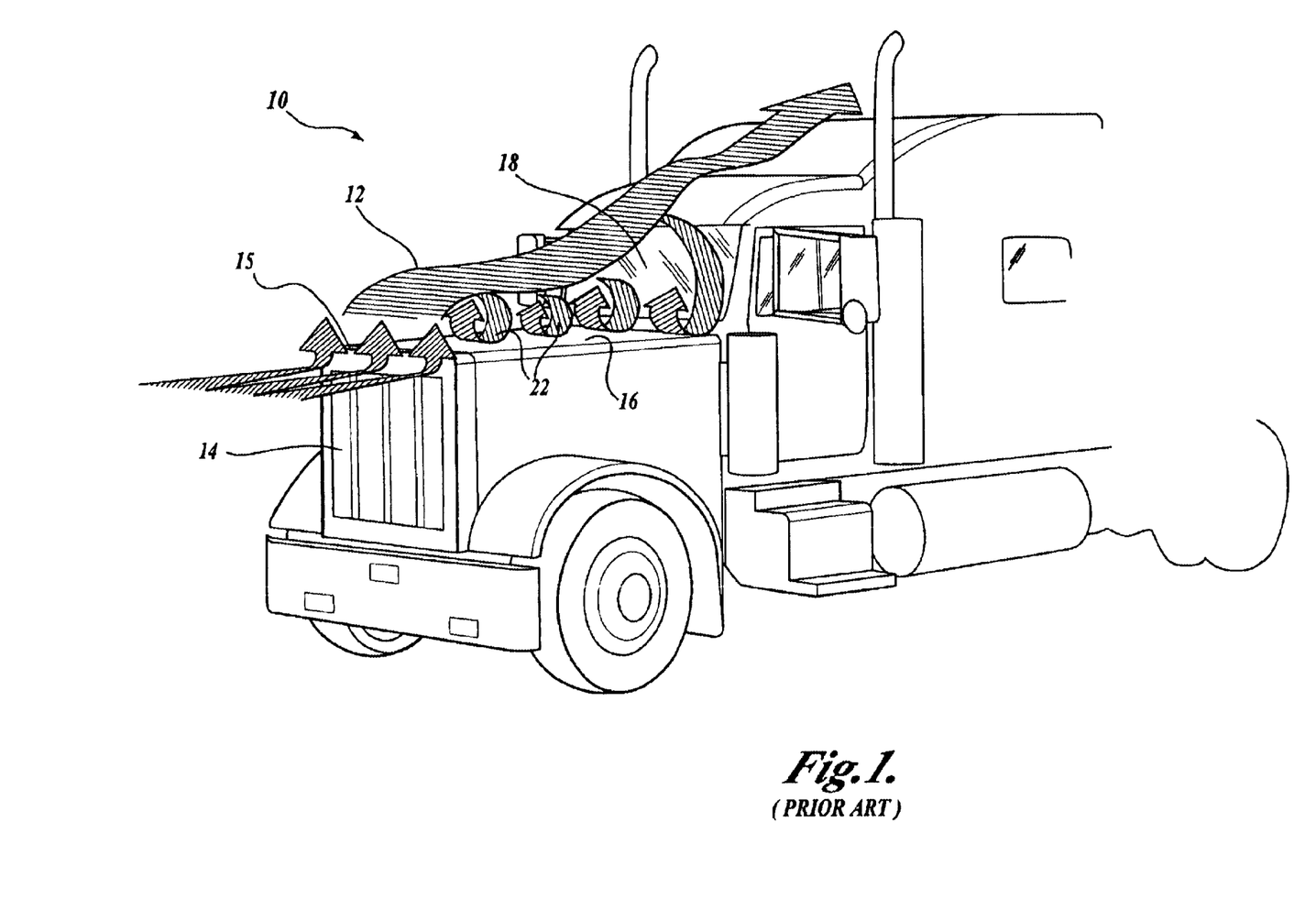
FIG. 1 is a perspective view of a prior art conventional vehicle front section showing the flow path of an air stream over the vehicle front section during movement of the vehicle.

The front profile of a conventional truck is typically a bluff body. Referring to FIG. 1, a perspective view of a prior art Class 8 truck 10 showing an airstream 12 flowing over a hood 16 is depicted. The depicted air stream 12 encounters the conventionally shaped Class 8 truck 10 at the substantially vertical surface of the front surface or grill 14 of the hood 16. (It will be appreciated that for purposes of the present aerodynamic discussion, the truck's 10 forward motion at highway speeds is equivalent to an air stream 12 having a similar but opposite velocity flowing over a stationary truck.) The air stream 12 turns upwardly as it negotiates the grill 14, and separates at a leading edge 15 of the hood 16, thereby forming a vortex or wake region 22 located aft of the leading edge 15. The airflow separation at the leading edge 15 causes the formation of a large wake region 22 and pressure losses due to eddy formation in the wake region, thereby increasing drag on the vehicle.

Furthermore, in practical applications, the air stream 12 will include ubiquitous highway particulates, e.g. road grime, which are circulated in the eddies formed in the wake region 22. The eddy driven recirculation of the grime results in an increased rate of deposition of the particulates contained in the air stream 12 upon the hood 16 and windshield 18. This results in a high rate of road film build-up—thus impairing the driver's vision, and therefore safety, and increasing the amount of labor and stops required to keep the truck's 10 windshield 18 clear, resulting in inefficiency and increased costs.

One method of reducing the bluff body characteristics of the conventional Class 8 truck and thus the resulting aerodynamic drag, is to streamline the outer contours of the front section of the truck 10. For example, in order to reduce abrupt changes in air flow over the hood, some modern truck hoods have been made to slope downwardly from the windshield toward the front of the truck, creating a less abrupt transition between the front grill 14 of the front section and the top surface of the hood 16. This more aerodynamic shape reduces the amount of flow separation, and consequently reduces the pressure drag exhibited upon the vehicle. The resulting vehicle shape, however, is significantly different from the aesthetically pleasing bluff-shape body of a conventional Class 8 vehicle. Therefore, although the resulting streamlined shape may be more aerodynamic and thus efficient, it often results in an unappealing aesthetic appearance to many truck operators and purchasers; causing a corresponding decrease in sales and loss of revenue. Further, such a design may still incorporate discontinuous regions, due to packaging for under hood components such as radiators, air ducting, or coolant tanks, that produce abrupt changes in air flow resulting in the creation of a wake region 22, again allowing road grime to be recirculated to impact and deposit upon the windshield 18 and an increase in drag.

Thus, there exists a need for an aerodynamically designed front section of a motor vehicle that mitigates drag forces and/or reduces grime build-up on the windshield while retaining the aesthetic appeal of a bluff body shape.

SUMMARY OF THE INVENTION

In accordance with one embodiment of the present invention, a truck front section comprising a grill, a hood, and a bridge assembly is provided. The grill has a substantially vertical front surface and an upper portion. The hood has an upper panel with a sloping front end disposed adjacent the grill upper portion. The bridge assembly is disposed above the front end of the hood upper panel and has a pair of oppositely disposed upright end members attached to the hood upper panel. The bridge assembly also has a substantially horizontal aerodynamically shaped member attached to the end members. The upper portion of the grill, the front end of the hood upper panel and the bridge assembly cooperatively form a duct generally disposed above the grill. The duct may be comprised of a single duct portion or multiple duct portions. The duct may discharge into a longitudinal channel formed in the upper panel. The upper portion of the grill may slope rearward. A horizontal width of an inlet of the duct may extend across substantially the entire length of the upper portion of the grill.

In accordance with aspects of another embodiment formed in accordance with the present invention, a truck hood having a front end, a rear end, and a longitudinal axis is provided. The truck hood includes an upper surface sloping downwardly from the rear end to the front end, the upper surface defining an upwardly-open, longitudinal channel. The truck hood includes a bridge assembly coupled to the upper surface and disposed at the front end of the truck hood above the upper surface, wherein the bridge assembly and the upper surface cooperatively form a duct having a generally forward-facing inlet, and an outlet in fluid communication with the upwardly-open, longitudinal channel. The duct flow area may decrease from the forward-facing inlet to the outlet. The front end of the upper surface may curve downwardly. A horizontal width of an inlet of the duct may extend across substantially the entire length of the front end of the upper surface.

In accordance with aspects of still another embodiment formed in accordance with the present invention, a front section of a vehicle having a longitudinal axis is provided. The front section includes an upper surface having a leading portion and a substantially horizontal downstream portion. The front section also includes a substantially vertical front surface coupled to the leading portion of the upper surface. The front section further includes a duct having an inlet disposed near a top end of the front surface and an outlet disposed at the downstream portion of the upper surface, wherein the leading portion of the upper surface is arcuate shaped. The front section may include an upwardly-open longitudinal channel formed in the downstream portion of the upper surface, the longitudinal channel in fluid communication with the duct outlet. The duct inlet may extend across substantially the entire length of the leading portion. The duct may converge from a first flow area measured at the inlet to a smaller second flow area at the outlet. The front section may further include a second duct and/or a second upwardly-open longitudinal channel. The upper portion of the substantially vertical front surface is rearwardly sloped to pass underneath the bridge assembly.

BRIEF DESCRIPTION OF THE DRAWINGS

The foregoing aspects and many of the attendant advantages of this invention will become more readily appreciated by reference to the following detailed description, when taken in conjunction with the accompanying drawings, wherein.

DETAILED DESCRIPTION OF THE PREFERRED EMBODIMENT

Figure 2:
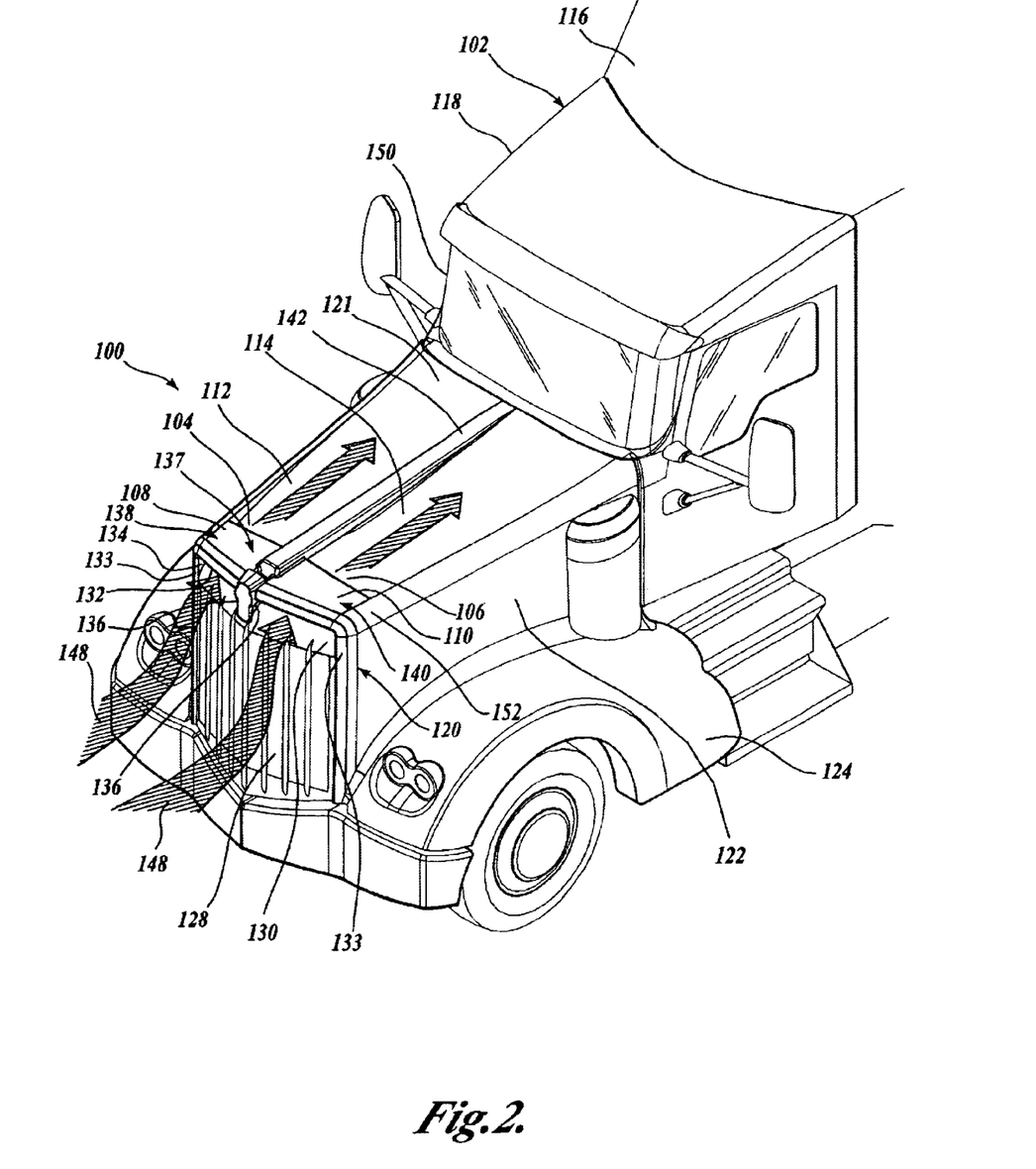
FIG. 2 is a perspective view of one embodiment of a ducted aerodynamic vehicle front section formed in accordance with the present invention.
Figure 3:
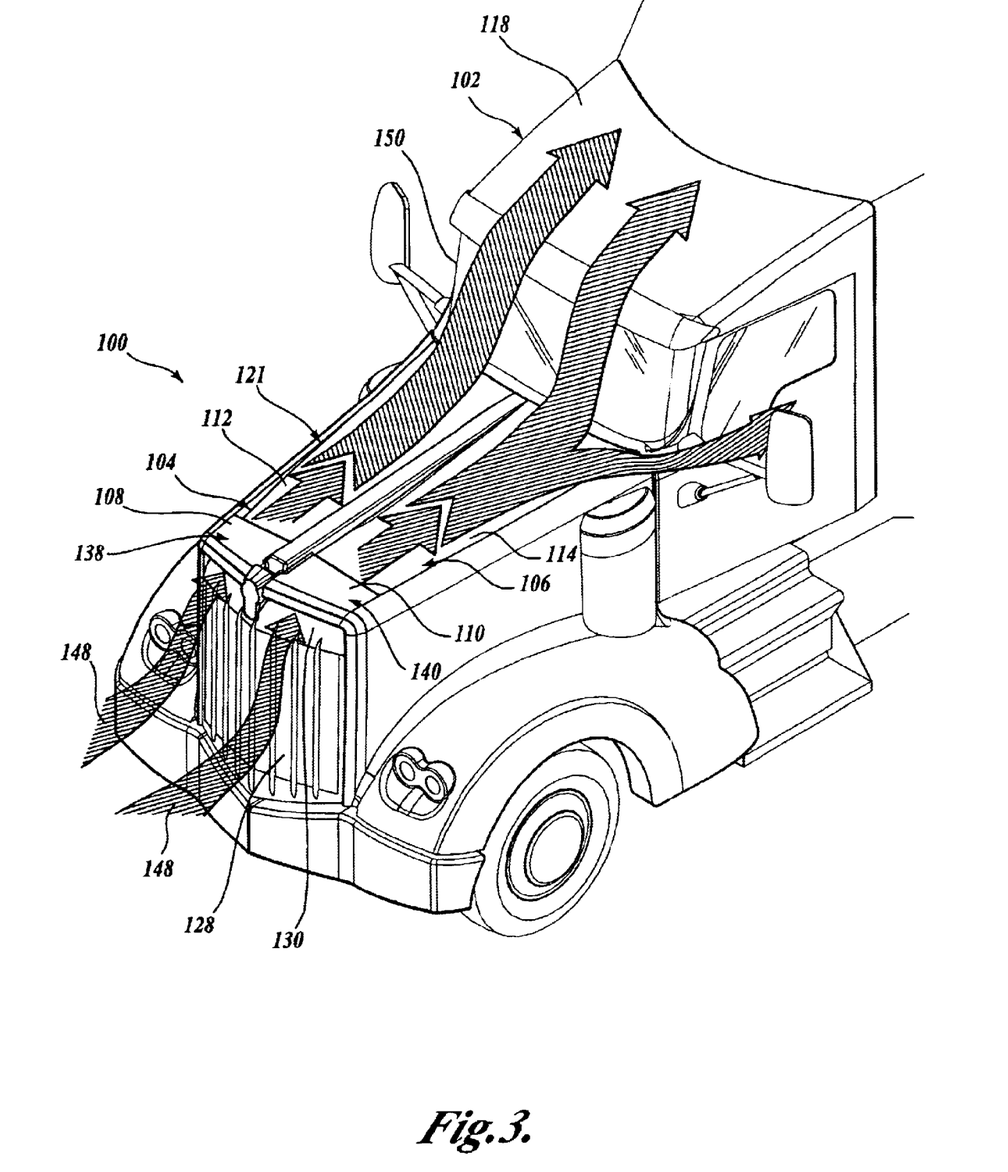
FIG. 3 is a perspective view of the vehicle front section shown in FIG. 2, more fully depicting the path of an air stream about the ducted aerodynamic vehicle front section.
Figure 4:
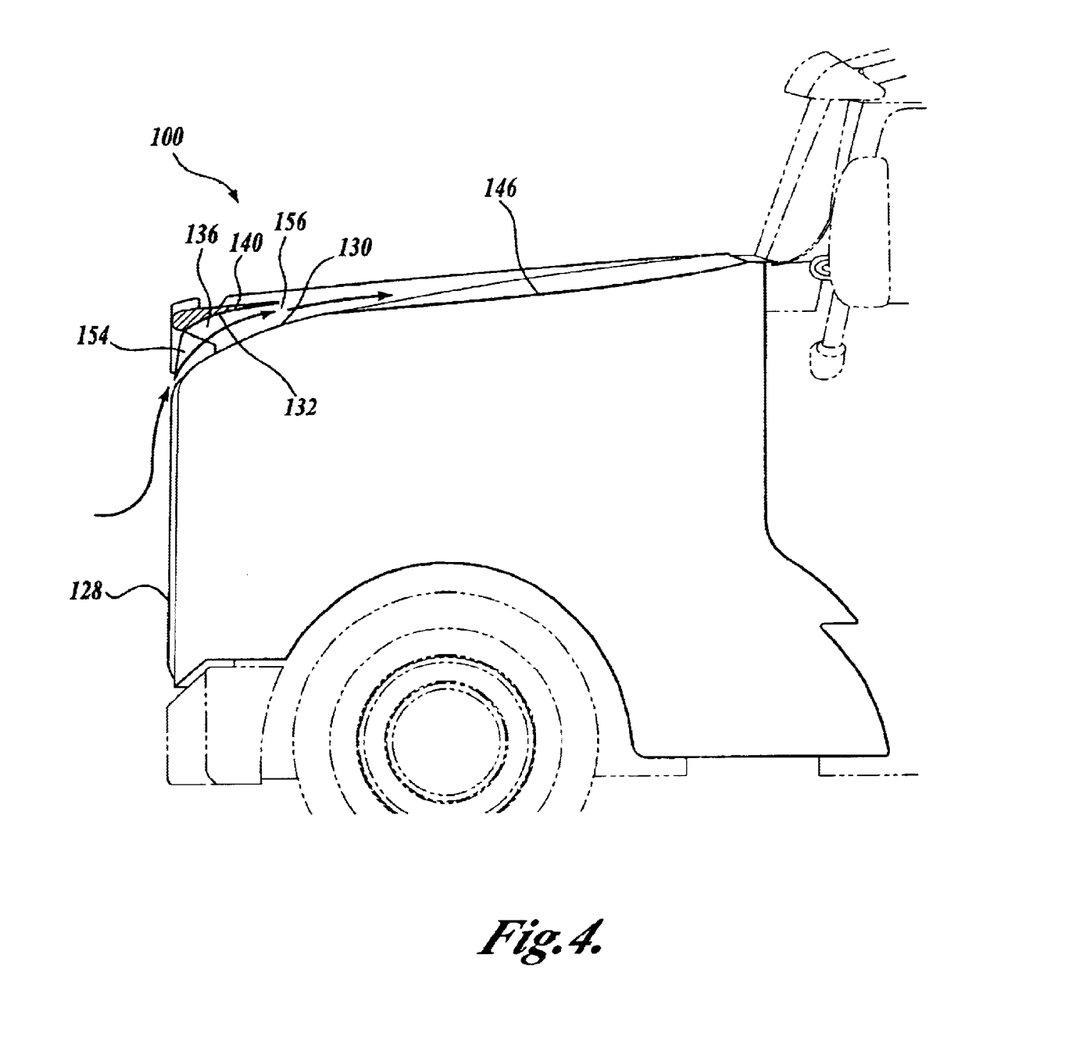
FIG. 4 is a partial cross-sectional side view of the vehicle front section shown in FIG. 3, the cross-section taken substantially along the length of a first air flow passageway.
Figure 5:
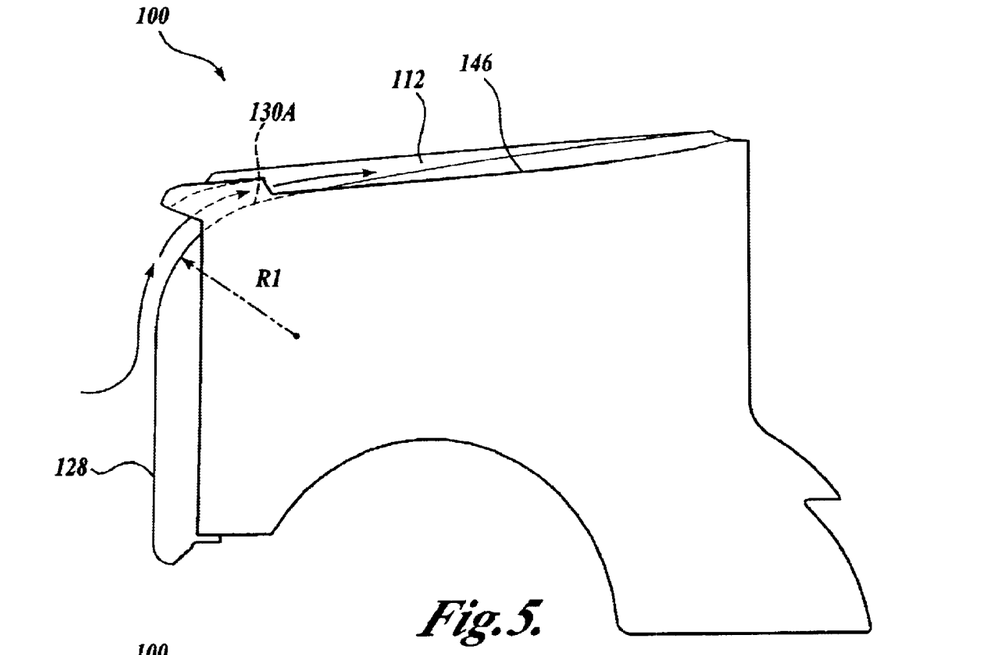
FIG. 5 is a simplified side view of one embodiment of a ducted aerodynamic vehicle front section formed in accordance with the present invention, showing a lower duct surface defined by an arc of a constant radius.

FIGS. 2–4 illustrate a ducted aerodynamic front section 100 of a motor vehicle formed in accordance with one embodiment of the present invention. Although the embodiments of the present invention will be described as implemented in reference to a Class 8 truck 102, one skilled in the relevant art will appreciate that the disclosed embodiments are illustrative in nature and should not be construed as limited to application with a Class 8 truck 102. It should therefore be apparent that the ducted aerodynamic front section 100 of the present invention has wide application, and may be used in any situation where reducing the drag and/or providing a clear field of vision for a driver of any type of a vehicle is desirable. It should be noted that for purposes of this disclosure, terminology such as "upper," "lower," "vertical," "horizontal," "fore," "aft," "inner," "outer," etc., should be construed as descriptive and not limiting. Further, for the purposes of this disclosure, the phrases "substantially vertical," "substantially horizontal," and "substantially parallel" are meant to mean surfaces angled 45 degrees or less relative to a vertical, horizontal, or parallel plane or line respectively.

Referring to FIG. 2, the ducted aerodynamic front section 100 of the present invention is suitable for use with a truck 102. The truck 102 includes a cab 118, a hood 120, and a sleeper box 116. The hood 120 generally covers a blocked shaped engine compartment housing and typically includes integral fenders 124. The hood 120 is pivotally coupled to the truck 102 to permit the entire hood 120 to rotate forward to allow access to the engine (not shown). Located in a upper panel or top surface 121 of the hood 120 are first and second air flow passageways 104 and 106. The first and second air flow passageways 104 and 106 run generally parallel with the longitudinal axis of the truck 102. The first and second air flow passageways 104 and 106 reduce the pressure drag forces exerted upon the truck 102 as it passes through a body of air by providing a more aerodynamic air flow path. Moreover, the air flow passageways 104 and 106 provide a relatively smooth transitioning passageway for redirecting air 148 from a substantially vertical front surface or grill 128 and having a substantially vertical flow path, to a substantially horizontal path of travel as the air 148 is discharged to the top surface 121 of the hood 120.

By smoothly redirecting the air 148 encountering the grill 128 over the hood 120, pressure drag forces are reduced, resulting in a decrease in the magnitude of the wake region. By channeling the air in this manner, the appealing aesthetic shape of the bluff front section of a conventionally designed Class 8 truck may be retained while providing the efficiencies of a streamlined body shape.

The separation of air flow from the top surface 121 is further inhibited in the disclosed embodiment by increasing the velocity, and thus decreasing the pressure, of the air stream 148 as the air stream passes through the converging air flow passageways 104 and 106. The substantially horizontally oriented wings, bridge, or aerodynamically shaped section 138 and 140 that form the upper boundary of the air flow passageways 104 and 106 are oriented and shaped to form the converging air flow passageways 104 and 106 by reducing the flow area along the length of the passageways 104 and 106, from the inlet 154 to the outlet 156 (See FIG. 4).

By reducing the flow area of the passageways 104 and 106 along the length of the flow path, a nozzle is created, increasing the velocity and decreasing the static pressure of the air stream as the air passes along the length of the passageways 104 and 106. As should be apparent to one skilled in the art, this increase in velocity and decrease in pressure reduces the tendency of the air stream 148 to separate as it accelerates (changes direction) to flow over the top surface 121. It will also be appreciated that the smoother (less turbulent) air flow over the hood 120 will result in less deposition of air borne contaminants (e.g., road grime) on the hood 120 and windshield 150 of the truck 102, as discussed below.

The structure of the air flow passageways 104 and 106 will now be described in further detail. The air flow passageways 104 and 106 may be subdivided into a ducted portion 108 and 110 and an open channel portion 112 and 114. For example, the first air flow passageway 104 includes a first ducted portion 108 that is in fluid communication with a first open channel portion 112. Similarly, the second air flow passageway 106 includes a second ducted portion 110 that is in fluid communication with a second open channel portion 114.

Still referring to FIGS. 2 and 4, each ducted portion 108 and 110 includes a lower duct surface 130, an upper duct surface 132, an outer sidewall 134 defined by the inner surfaces of a pair of oppositely disposed upright end members 133, and an inner sidewall 136 formed by the outer surfaces of the passageway divider 142. The lower duct surface 130 in the illustrated embodiment is formed by increasing the rake, or inclination, of the upper portion of the front grill 128 to form an arcuate surface. More specifically, and in reference to FIGS. 2 and 4, the upper portion of the front grill 128 is sloped and/or curved to smoothly transition to the open channel portions 112 and 114.

Figure 6:
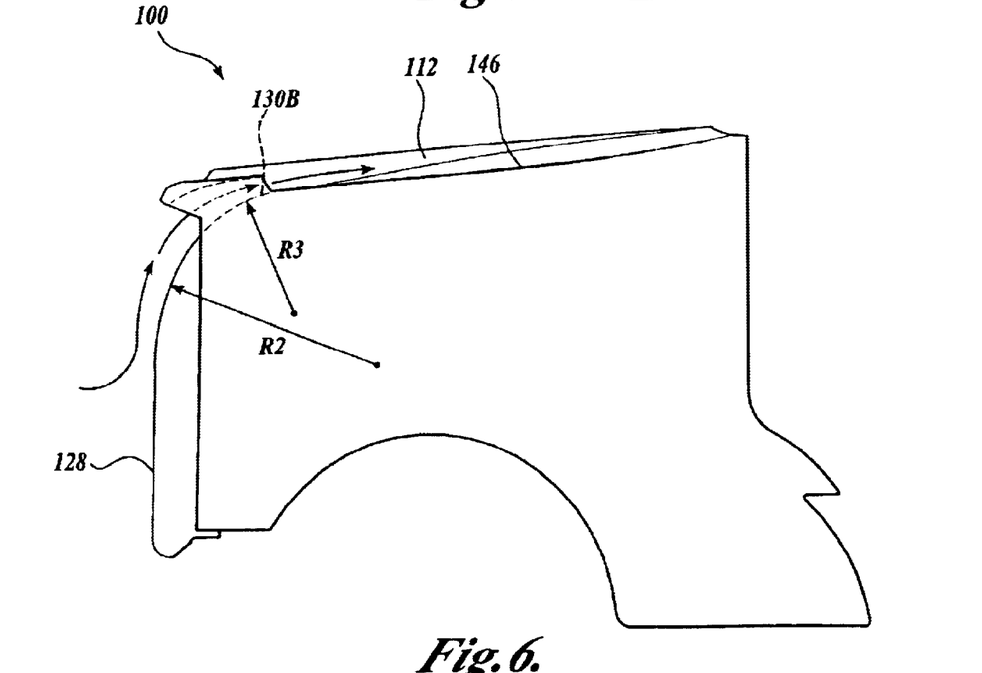
FIG. 6 is a simplified side view of a second embodiment of a ducted aerodynamic vehicle front section formed in accordance with the present invention, showing a lower duct surface defined by arcs of varying radiuses.

As shown in the representative embodiments shown in FIGS. 5–9, the lower duct surfaces 130A may be shaped in various manners. For example, referring to FIG. 5, the upper portion of the grill 128 may be curved at a constant radius R1 until it meets the lower surfaces 146 of the open channel portions 112 and 114 of the air flow passageways. Referring to FIG. 6, in another embodiment formed in accordance with the present invention, the upper portion of the grill 128 is curved in such a manner as to create lower duct surfaces 130B defined by varying radiuses. More specifically, the upper portion of the grill 128 is first swept back at a radius R2 and thereupon at a shorter radius R3 until the lower duct surfaces 130B are tangent with the lower surfaces 146 of the open channel portions of the air flow passageways.

Figure 7:
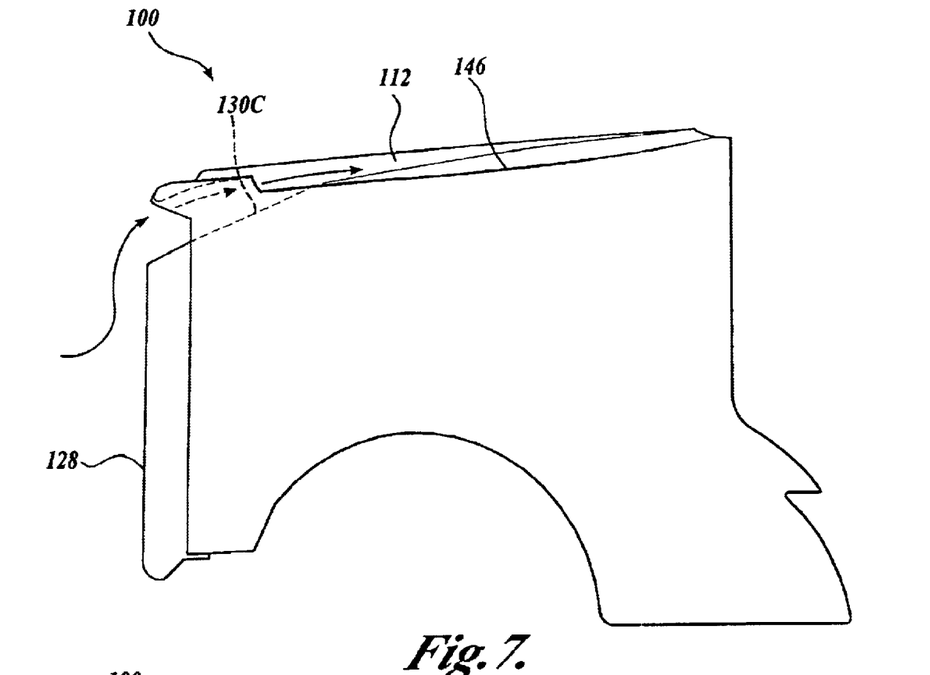
FIG. 7 is a simplified side view of a third embodiment of a ducted aerodynamic vehicle front section formed in accordance with the present invention showing a planar lower duct surface.
Figure 8:
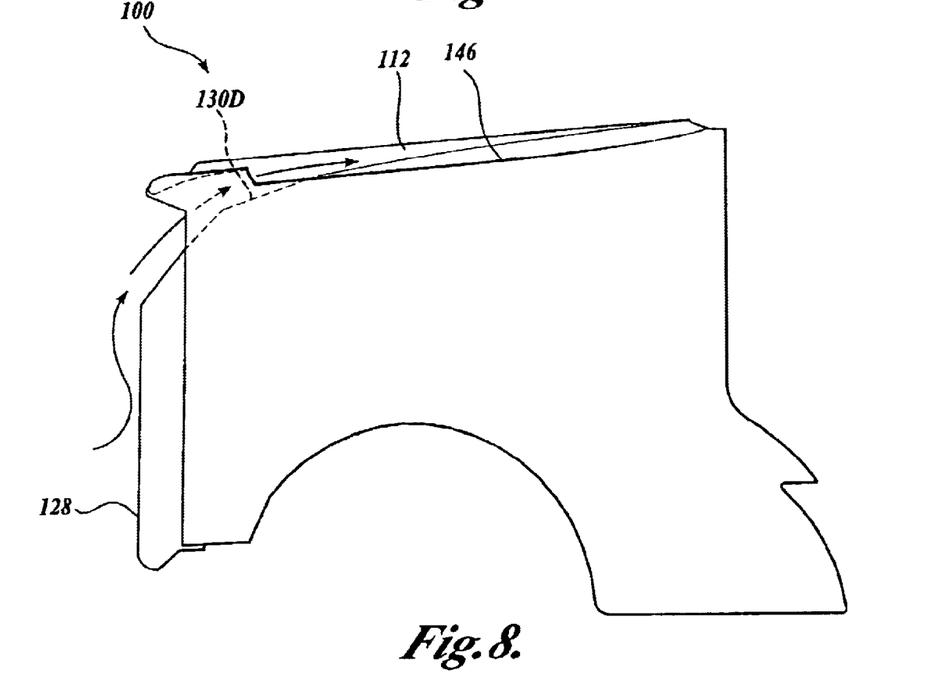
FIG. 8 is a simplified side view of a fourth embodiment of a ducted aerodynamic vehicle front section formed in accordance with the present invention showing a lower duct surface defined by multiple planar surfaces angled relative to one another.
Figure 9:
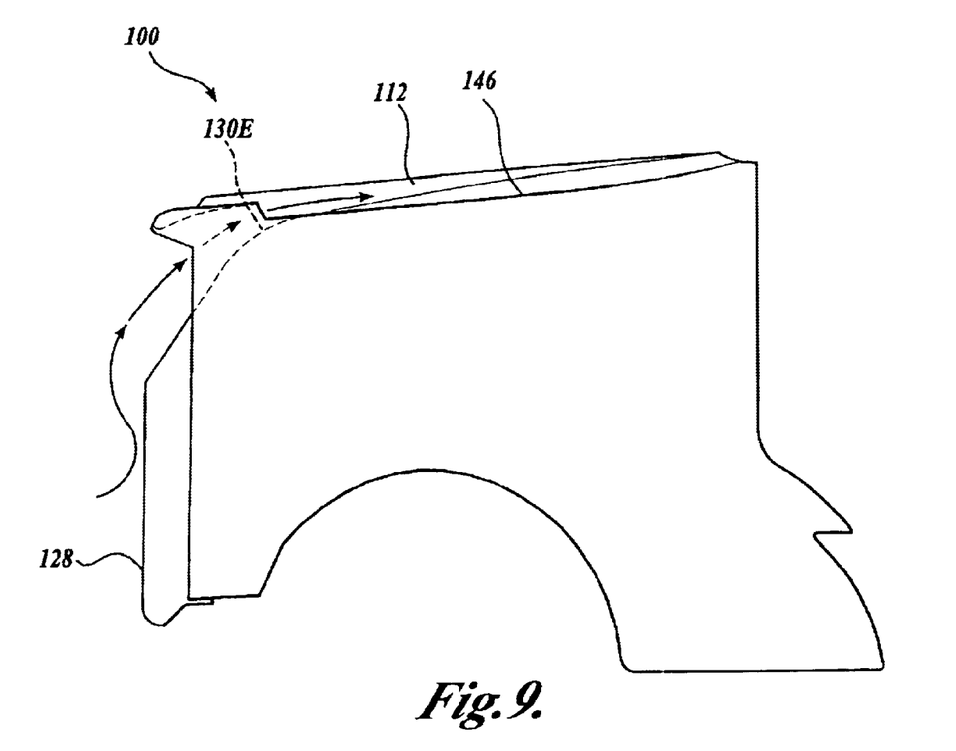
FIG. 9 is a simplified side view of a fifth embodiment of a ducted aerodynamic vehicle front section formed in accordance with the present invention showing a lower duct surface defined by a planar surface translating into an arcuate surface.

Referring to FIG. 7, the lower duct surfaces 130C may also be defined by a substantially planar region between the upper portion of the grill 128 and the lower surface 146 of the open channel portions 112 (and 114). Referring now to FIG. 8, the lower duct surfaces 130D may alternatively be shaped as multiple planar surfaces angled relative to one another. Referring to FIG. 9, the upper grill portion 128 may be connected to the lower surfaces 146 of the open channel portions by a curvilinear/planar lower duct surfaces 130E comprising a planar surface interconnected to a curved surface. Although various embodiments of the lower duct surfaces 130 have been depicted and described, it should be appreciated by one skilled in the art that various changes may be made therein from the embodiments depicted without departing from the spirit and scope of the invention.

Referring again to FIG. 2, the lower duct surfaces 130 pass underneath a bridge assembly 137 comprised of a pair of substantially horizontally-oriented first and second aerodynamically shaped members 138 and 140. The underside of the first and second aerodynamically shaped members 138 and 140 define the upper duct surfaces 132. The first and second aerodynamically shaped members 138 and 140 are supported at their inner ends by a passageway divider 142 that runs fore and aft on the hood 120 of the truck 102. The substantially fore and aft oriented vertical walls of the passageway divider 142 form the inner sidewalls 136 of the ducted portions 108 and 110. The first and second aerodynamically shaped members 138 and 140 are supported at their outer ends by upright end members 152 of the engine component housing 122. The upright end members 152 may be an integral extension of the hood 120 sidewalls, and extend upwardly to form the outer sidewalls 134 of the ducted portions 108 and 110. It should also be appreciated that the aerodynamically shaped members 138 and 140, divider 142, lower duct surface 130, and sidewalls 152 may be shaped and oriented to direct the flow over the hood in a desired direction, for example diverting the air flow away from or into the windshield. Further, although the illustrated aerodynamically shaped members 138 and 140 are shown in a substantially horizontal orientation, it should be apparent to one skilled in the art that the inclination of the aerodynamically shaped member 138 and 140 may be adjusted to have an upward or downward inclination.

In light of the above description of the structural components of the ducted aerodynamic front section 100, the operation of the present invention will now be described. Referring to FIG. 3, as the truck 102 moves the front grill 128 impacts an air stream 148 and directs the air stream into the air flow passageways 104 and 106. The air stream passes through the ducted portions 108 and 110 of the air flow passageways 104 and 106, thereby passing under the first and second aerodynamically shaped members 138 and 140 and discharges into the open channel portions 112 and 114 of the air flow passageways 104 and 106. As the air stream 148 is discharged into the open channel portions 112 and 114 in a center portion of the top surface 121, the wake region 22 (see FIG. 1) normally created by the separation of air flow in proximity to a leading edge of a hood in a conventional Class 8 truck, is filled, thereby reducing pressure drag forces exerted on the truck.

Further, as the air stream 148 flows through the open channel portions 112 and 114 of the air flow passageways 104 and 106, the air stream 148 is directed to flow over the windshield 150 to provide a protective air curtain over the windshield 150. Referring to FIG. 1, more specifically, in conventional designs, a turbulent wake region 22 is formed directly in front of the windshield 18. Turbulent eddies may expel particulates entrained in the air stream resulting in undesirable deposits on the windshield 150 and hood 120. This results in a high rate of road film and fluid buildup—thus impairing the driver's vision, and therefore, safety, and increasing the amount of stops and labor required to keep the truck's windshield 18 clear.

Referring to FIG. 3, in contrast to FIG. 1, the air passageways 104 and 106 direct the air stream 148 to impact lower on the windshield 150 and also at a lower angle of attack or inclination relative to the surface of the windshield 150 as compared to the conventionally designed truck shown in FIG. 1. In this embodiment, the air stream 148 is directed along the surface of the windshield 150, thereby creating a curtain of air flowing over and parallel with the surface of the windshield 150. This curtain of air aids in carrying road grime, fluids, and like substances over and passed the windshield, thereby helping to maintain a clear field of vision for the driver. Further, the air curtain acts as a protective layer over the windshield, impeding other air currents with entrained road grime and the like from impacting and depositing on the windshield, thus aiding in providing a clear field of vision for the driver. Further still, directing the air flow in such a manner results in a substantial reduction in the creation of vortices and turbulent eddies in proximity to the windshield 150. Inasmuch as such turbulent structures result in the creation of drag and recirculation of particulates and other matter in proximity of the windshield 150 and thus increased rates of road film build-up, the illustrated embodiment of the present invention further reduces drag and rates of road film buildup by decreasing eddy formation in proximity to the windshield.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A truck front section comprising:
   (a) a grill having a substantially vertical front surface and an upper portion;
   (b) a hood having an upper panel with a sloping front end disposed adjacent the grill upper portion; and
   (c) a bridge assembly disposed above the front end of the hood upper panel, the bridge assembly having a pair of oppositely disposed upright end members attached to the hood upper panel, and a substantially horizontal aerodynamically shaped member attached to the end members, the aerodynamically shaped member having a leading edge and a trailing edge;
   wherein the upper portion of the grill, the front end of the hood upper panel and the bridge assembly cooperatively form a duct generally disposed above the grill, and wherein the hood upper panel further comprises an upwardly-open channel extending rearwardly from the duct along a majority of a length of the hood upper panel.

2. The truck front section of claim 1, wherein the substantially horizontal aerodynamically shaped member is comprised of at least a first aerodynamically shaped member section and a second aerodynamically shaped member section, wherein the upper portion of the grill, the front end of the hood upper panel and the first aerodynamically shaped member section form a first duct portion and the upper portion of the grill, the front end of the hood upper panel and the second aerodynamically shaped member section form a second duct portion, the first and second duct portions comprising the duct.

3. The truck front section of claim 1, wherein the duct defines a flow path that converges from the aerodynamically shaped member leading edge to the aerodynamically shaped member trailing edge.

4. The truck front section of claim 1, wherein the upwardly-open channel extends substantially the entire length of the hood upper panel.

5. The truck front section of claim 1, wherein the upper portion of the grill includes an arcuate portion which slopes rearward.

6. The truck front section of claim 5, wherein the arcuate portion of the grill defines a cylindrical section having a constant radius.

7. The truck front section of claim 1, wherein a horizontal width of an inlet of the duct extends across substantially the entire length of the upper portion of the grill.

8. The truck front section of claim 1, wherein the upper portion of the grill, the front end of the hood upper panel and the bridge assembly cooperatively form a second duct generally disposed above the grill.

9. The truck front section of claim 1, wherein a top surface of the aerodynamicly shaped member is oriented so as to be inclined about 20 degrees or less from a horizontal plane.

10. The truck front section of claim 1, wherein a top surface of the aerodynamic shaped member is oriented so as to be inclined about 10 degrees or less from a horizontal plane.

11. The truck front section of claim 1, wherein a top surface of the aerodynamic shaped member is oriented so as to be inclined about 5 degrees or less from a horizontal plane.

12. A truck hood having a front end, a rear end, and a longitudinal axis, the truck hood comprising:
   (a) an upper surface sloping downwardly from the rear end to the front end, the upper surface defining an upwardly-open, longitudinal channel extending along a majority of a length of the upper surface; and
   (b) a bridge assembly coupled to the upper surface and disposed at the front end of the truck hood above the upper surface, wherein the bridge assembly and the upper surface cooperatively form a duct having a generally forward-facing inlet, and an outlet in fluid communication with the upwardly-open, longitudinal channel.

13. The truck hood of claim 12, wherein the upper surface defines a second upwardly-open, longitudinal channel, and the bridge assembly and upper surface further form a second duct having a generally forward-facing inlet, and an outlet in fluid communication with the second upwardly-open longitudinal channel.

14. The truck hood of claim 12, wherein the duct flow area decreases from the forward-facing inlet to the outlet.

15. The truck front section of claim 14, wherein an upper portion of the substantially vertical front surface is rearwardly sloped to pass underneath the bridge assembly.

16. The truck hood of claim 12, wherein the front end of the upper surface curves downwardly.

17. The truck hood of claim 12, wherein a horizontal width of an inlet of the duct extends across substantially the entire length of the front end of the upper surface.

18. The truck hood of claim 12, wherein a top surface of the bridge assembly extends laterally across a majority of the upper surface and is inclined about 20 degrees or less from a horizontal plane.

19. The truck hood of claim 12, wherein a top surface of the bridge assembly extends laterally across a majority of the upper surface and is inclined about 10 degrees or less from a horizontal plane.

20. The truck hood of claim 12, wherein a top surface of the bridge assembly extends laterally across a majority of the upper surface and is inclined about 5 degrees or less from a horizontal plane.

21. A front section of a vehicle having a longitudinal axis, the front section comprising:
    (a) an upper surface of a hood of the vehicle having a leading portion and a substantially horizontal downstream portion;
    (b) a substantially vertical front surface coupled to the leading portion of the upper surface; and
    (c) a duct at least partially defined by the upper surface of the hood and having an inlet disposed near a top end of the front surface, an outlet disposed at the downstream portion of the upper surface, and an aerodynamic member disposed above the upper surface and extending between the inlet and the outlet, the aerodynamic member having a top surface inclined about 20 degrees or less from a horizontal plane, wherein the leading portion of the upper surface is arcuate shaped.

22. The front section of claim 21, further comprising:
    an upwardly-open longitudinal channel formed in the downstream portion of the upper surface, the longitudinal channel in fluid communication with the duct outlet.

23. The front section of claim 21, wherein the duct inlet extends across substantially the entire length of the leading portion.

24. The front section of claim 21, wherein the duct converges from a first flow area measured at the inlet to a smaller second flow area at the outlet.

25. The front section of claim 21, further comprising a second duct having an inlet disposed near a top end of the front surface and an outlet disposed at the downstream portion of the upper surface.

26. The front section of claim 25, further comprising:
    a second upwardly-open longitudinal channel formed in the downstream portion of the upper surface, the longitudinal channel in fluid communication with the outlet of the second duct.

27. The front section of claim 21, wherein the upper surface of the hood further comprises an upwardly-open channel extending rearwardly from the outlet of the duct along a majority of a length of the hood upper panel.

28. The front section of claim 21, wherein the top surface is inclined about 10 degrees or less from a horizontal plane.

29. The front section of claim 21, wherein the top surface is inclined about 5 degrees or less from a horizontal plane.

* * * * *

UNITED STATES PATENT AND TRADEMARK OFFICE
CERTIFICATE OF CORRECTION

PATENT NO. : 6,736,447 B2
DATED : May 18, 2004
INVENTOR(S) : G.J. Angelo et al.

It is certified that error appears in the above-identified patent and that said Letters Patent is hereby corrected as shown below:

<u>Title page</u>,
Item [73], Assignee, "Paccar Inc," should read -- PACCAR Inc, --.

Signed and Sealed this

Eleventh Day of April, 2006

JON W. DUDAS
*Director of the United States Patent and Trademark Office*